United States Patent Office 3,093,211
Patented June 11, 1963

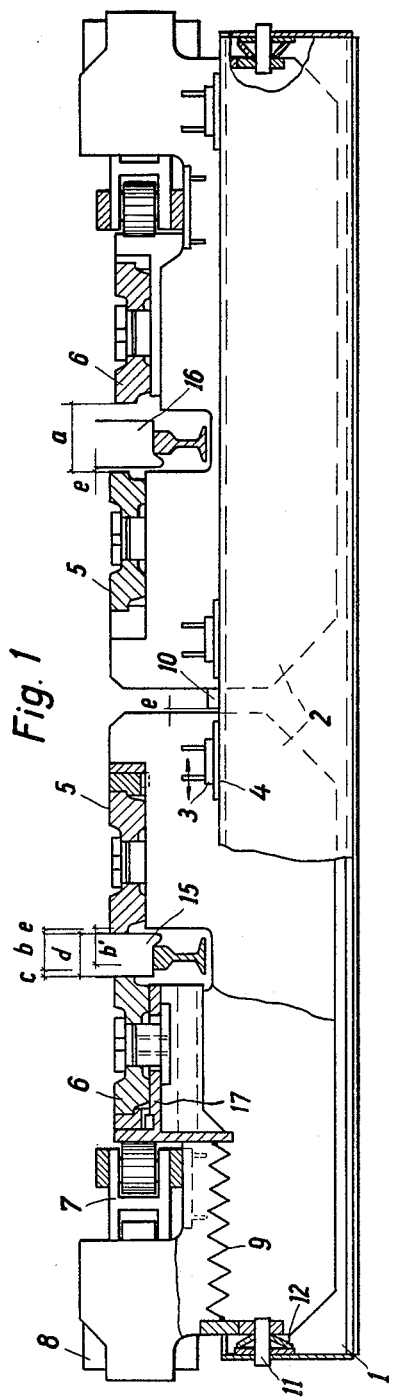

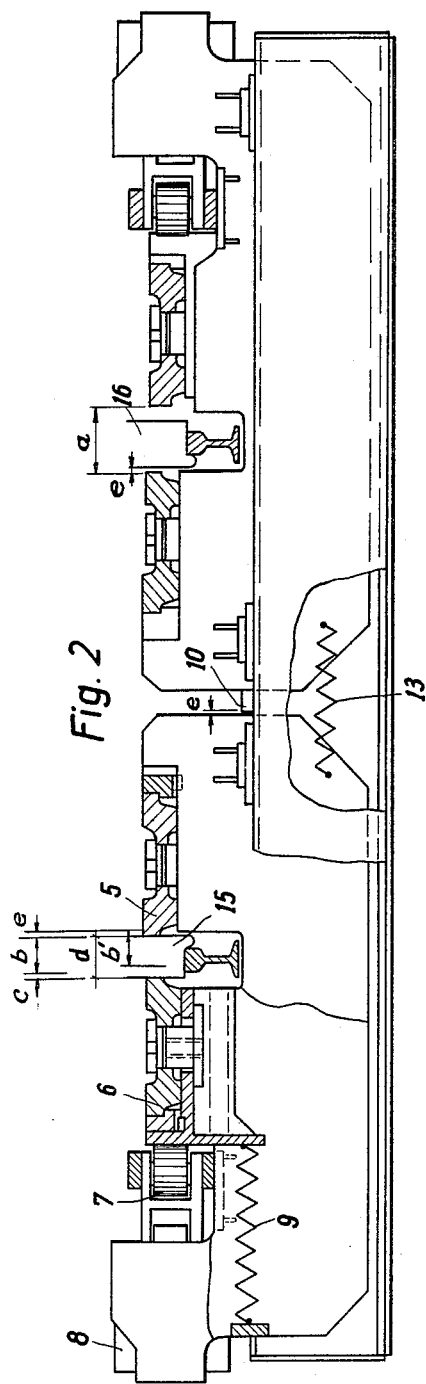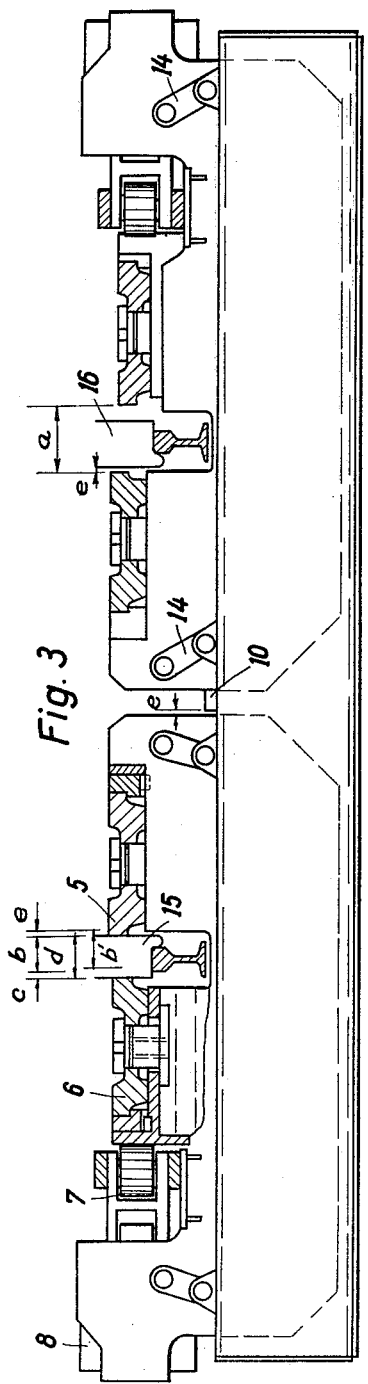

3,093,211
BEAM RETARDER WITH BRAKE BEAMS
SUPPORTED BY STIRRUPS
Adolf Pollmann, Dinslaken, Germany, assignor to August Thyssen-Hutte Aktiengesellschaft, Duisburg-Hamborn, Germany
Filed Aug. 18, 1960, Ser. No. 50,547
7 Claims. (Cl. 188—62)

The invention relates to improved beam retarders and more particularly to beam retarders of the type provided with brake beams supported by stirrups.

In beam retarters of the type provided with brake beams supported by stirrups, the brake beams define a space for the passage of the wheels of a car therebetween. One of the brake beams is usually adjustable so as to vary the spacing between the brake beams, the other brake beam being usually supported in a fixed position adjacent the rail and adapted for contacting the wheel of the vehicle as it passes in the space between the beams. The effect is such, however, that in the case of known retarders light cars which are intended to pass in unbraked condition through the retarder are unintentionally braked by the brake beam which is adjusted close to the position of the rail. Thus it is seen that heretofore brake beam retarders were adapted principally for the braking of the wheels of heavy vehicles and in a manner which is deficient with regard to the operation of the retarder with vehicles lighter in weight.

It is a principal object of the invention to avoid the above mentioned deficiencies and to provide a retarder wherein effective braking will be obtained on both light and heavy vehicles while both heavy and light vehicles may pass unimpeded between the brake beams when it is desired to permit the vehicles to pass without restraint between the brake beams.

It is a further object of the invention to adjust the position of both brake beams during a braking operation.

It is a further object of the invention to maintain both brake beams spaced from a wheel passing through the brake beams when it is desired to allow the unrestrained passage of the wheel between the brake beams.

It is a still further object of the invention to adjust the position of only one of the brake beams in correlation with a braking operation, the other brake beam being controlled in accordance with the position of the first said brake beam to effect a braking function.

According to the invention, the stirrups are displaced against a stop in the direction toward the middle of the track by a means exercising a return force which the wheel entering between the brake beam can overcome to move the stirrup from the stop.

In a first embodiment the return force can be produced by a spring supported by the substructure. In another embodiment two stirrups are biased against each other by a spring, and in a third embodiment the stirrups are supported for pendulous movement in such a way that their dead weight exerts a return force toward the stop.

In the drawing:

FIG. 1 shows a retarder partly in cross section in the area of a pair of stirrups with a spring suspension of the stirrups on the substructure frame;

FIG. 2 shows a retarder partly in cross-section similar to FIG. 1, but with opposed spring biasing of the stirrups; and FIG. 3 shows a retarder partly in cross-section similar to FIGS. 1 and 2, but with a pendulous support of the stirrups.

Between the sides of a substructure frame 1 two stirrups 2 are located for slidable displacement. The stirrups are provided with claws 3 which are slidably supported for movement in slides 4 supported on the sides of the substructure frame. This is merely a convenient arrangement and the stirrups may be slidably supported relative to the frame in any manner well within the purview of a man skilled in the art. The stirrups are adapted to be displaced in either direction along the substructure, as indicated by the arrows in FIG. 1. The sliding claws 3 are attached preferably by welding to the stirrup, which claws are slidable in slide piece 4 fastened to the upper flange of substructure frame 1. Each stirrup 2 supports an internal brake beam 5 and an external brake beam 6. The latter beam is supported on a slide chair 17 which permits sliding of beam 6 on stirrup 2. Numeral 7 designates an actuating roller for the external brake beam 6 and numeral 8 represents a pack of rubber constituting an abutment for the roller 7. Numeral 9 is a spring which urges the slide chair toward the roller 7. Between the stirrups the frame 1 has a double stop 10 centrally located between the tracks. Each of the embodiments discloses means for urging the stirrups against the stops when the wheels are not passing through the space between the stirrups in the brake retarding position. Thus the internal brake beam is normally displaced to enable free passage between the beams of a wheel.

According to FIG. 1 the front walls of the frame 1 support on guide pivots 11 a pack of cup springs 12 (only one cup spring is drawn symbolically) which urge stirrups 2 against the stop 10. In FIG. 2 both stirrups are biased by a tension spring 13 and pressed against the stop 10 by the tension spring. In FIG. 3 each stirrup is supported by links 14 which by their inclined position urge the stirrups against the stop 10.

In the three figures the left half shows the location of the retarded wheel 15, in the right half the location of the wheel 16 passing without brake resistance.

For the wheel 16 passing without brake resistance a distance $e$ is provided between the internal side of the wheel and the brake beam 5 because of the spring 12 or the spring 13 or the links 14. The dimension $a$ of the spring between the beams is obtained by release of the actuating roller 7. Before a car arrives that is to be retarded the actuating roller 7 together with brake beam 6 is advanced. The spacing between the beams is reduced to $b'$ as shown at the left retarder in FIG. 1. $b'$ is chosen to be smaller than the wheel width $d$. The wheel 15 coming into the retarder widens the groove to $$c_i + b = d$$

which initiates the retarding or braking effect. This causes sliding of stirrup 2 by an amount equal to "$e$" and the brake beam 6 is displaced by an amount "$c$," the latter representing the compression of the rubber pack 8. Since $b=b'$, stirrup 2 is displaced by the dimension $e$ outer spring 12 or spring 13 is compressed or the links 14 are swung toward a vertical position. The return forces are constructively adjusted to the other forces acting on the wheel. After wheel 16 has passed the retarder, the beams return to their original positions under the action of the rubber pack 8 and the springs 12 or 13 or links 14, and the beam spacing returns to a magnitude corresponding to "$b'$."

In operation the retarder functions as follows:

Initially and before a braking operation, the stirrups 2 are in contact with the abutment or stop 10 under the action of the springs 12 or 13 or by virtue of the arrangement of links 14. The brake beams 5 in the latter position are spaced a distance "$e$" from the face of a wheel 15 which is adapted to pass on the rail between the brake beams 5 and 6. Brake beam 6 controls the braking of the vehicle in the sense that when brake beam 6 is retracted to a position which will not interfere with the wheels of the passing vehicle, said vehicle will pass freely between the brake beams in an unbraked condition. Thus, in the unbraked position brake beam 5 will be spaced from the wheel a distance "$e$," while brake beam 6 will be spaced from the wheel a distance corresponding to the retracted position of roller 7 which corresponds to the distance "$a$" minus "$e$" minus "$d$" as can be seen in the right side of FIG. 1.

In order to effect a braking operation, roller 7 is displaced towards brake beam 5 by an external linkage means not shown, to cause the brake beam 6 to slide with chair 17 relative to stirrup 2 to a position whereat brake beam 6 is spaced from brake beam 5 a distance "$b'$" which is less than the width "$d$" of a wheel of the vehicle. Clearly, the brake beam 6 will be in the path of the wheel. Since brake beam 5 is spaced a distance "$e$" from one of the faces of the wheel, the distance of brake beam 5 to the other face of the wheel will be "$d$"+"$e$." The amount of interference between brake beam 6 and the wheel therefore will be $(d+e)-b'$. The amount of interference will be regulated according to the degree of braking effort necessary to produce the desired effect, e.g. braking to a halt, slowing the vehicle down, etc. The degree of braking effort, of course, will be related to the weight of the vehicle and the speed thereof.

As the wheel of the vehicle contacts brake beam 6, there is initially caused a displacement of stirrup 2 against the action of springs 12 or 13 or the effect of links 14, since the resistance effect of springs 12 or 13 or links 14 are substantially less than the resistance effect of rubber pack 8. Brake beam 5 then comes into contact with the wheel after displacement of the stirrup and the brake beam 5 by a distance "$e$." The brake beam 6 will still be in interfering relation with the wheel (i.e. $b'<d$) and compaction of rubber pack 8 will then take place, whereupon the spacing between the brake beams will be made equal to the width of the wheel and a braking force will be exerted on the latter. After the wheel has passed between the brake beams, stirrup 2 is returned to its original position against the stops by springs 12 or 13 or links 14 and brake beam 6 is caused to slide on stirrup 2 under the action of roller 7 biased by rubber pack 8 until brake beam 6 also reaches its original position.

It will be obvious to those skilled in the art to modify and vary the disclosed embodiments without departing from the spirit of the following claims.

What is claimed is:

1. A brake beam retarder for engaging the wheel of a vehicle operable on a rail, the retarder comprising: a pair of brake beams each being positioned on opposite sides of the rail, a stirrup rigidly supporting one of said brake beams, means slidably supporting the other of said brake beams on said stirrup for movement transverse of said rail, means supporting said stirrup for movement transverse of said rail, a stop operatively positioned with respect to said rail with said stirrup abutting against said stop whereby said one brake beam is operatively positioned with respect to said rail to allow the free passage of said wheel past said one brake beam, means operatively coupled to said stirrup urging the same against said stop, and elastic means of a strength greater than the means urging the stirrup against the stop, said elastic means being in engagement with the other of the brake beams for supporting the latter in a displaced position relative to the rail such that when a wheel passes between the brake beams and the brake beams are spaced apart a distance less than the width of the wheel, the wheel contacts the other of the brake beams, to cause displacement of the stirrup against the action of the means urging the stirrup against the stop until said one brake beam contacts the wheel whereafter the elastic means will then be deformed to allow displacement of the other brake beam.

2. A retarder as claimed in claim 1, wherein the means urging the stirrup against the stop is a spring.

3. A retarder as claimed in claim 1 comprising a further pair of brake beams operatively associated with a second rail and a further stirrup supporting said further pair of brake beams on a side of said stop opposite to that facing the first said stirrup such that said stirrups straddle said stop, and wherein the means urging the first said stirrup against the stop is a spring connected to said first stirrup, said spring also being connected to said further stirrup to cause both said stirrups to contact said stop.

4. A retarder as claimed in claim 3 wherein said stop is centrally positioned between said rails and said spring urges both said stirrups against said stop to cause the one brake beam of each pair of beams to be positioned to allow free passage of wheels therepast.

5. A retarder as claimed in claim 1 wherein the means supporting the stirrup is a frame and the means urging the stirrup against the stop is a spring which is supported by the frame.

6. A brake beam retarder for engaging the wheel of a vehicle operable on a rail, the retarder comprising: a pair of brake beams each being positioned on opposite sides of a rail and in spaced relation, a stirrup rigidly supporting one of the brake beams, means slidably supporting the other brake beam on said stirrup, a stationary stop, means for urging the stirrup against the stop and allowing adjustment of the position of the stirrup relative to the stop, said stop being operatively positioned relative to said rail so that with said stirrup in contact with the stop said one brake beam is spaced from a wheel passing on said rail, elastic means engaging the other brake beam for sliding the same relative to said stirrup in a direction transverse of said rail to vary the spacing between said brake beams, the latter means being of greater strength than the means urging the stirrup against the stop so that when a wheel passes between the brake beams, and the beams are spaced apart a distance less than the width of the wheel, the wheel initially causes movement of the other brake beam to in turn cause adjustment of the position of the stirrup relative to the stop until said one brake beam contacts the wheel whereafter the other brake beam will be further displaced relative to the stirrup against the action of the elastic means.

7. A retarder as claimed in claim 6 wherein the means operatively coupled to the stirrup to urge the same against the stop comprises a pair of parallel links pivotally connected to said stirrup, said links being inclined whereby said stirrup abuts said stop, to cause the weight of said stirrup to urge the same against said stop.

References Cited in the file of this patent

UNITED STATES PATENTS

| 1,920,760 | Meyer | Aug. 1, 1933 |
| 2,943,709 | Schode | July 5, 1960 |

FOREIGN PATENTS

| 945,153 | Germany | July 5, 1956 |
| 947,172 | Germany | Aug. 9, 1956 |